US005619095A

United States Patent [19]

Salyer et al.

[11] Patent Number: 5,619,095

[45] Date of Patent: Apr. 8, 1997

[54] PROJECTION CATHODE RAY TUBE HAVING TAPERED SHAFT SCREW TARGET ASSEMBLY

[75] Inventors: Kenneth S. Salyer, Lexington, Ky.; Stanley J. Tofield, Crawley; Anthony B. Harrup, West Byfleet, both of United Kingdom

[73] Assignee: Hughes Aircraft Company, Los Angeles, Calif.

[21] Appl. No.: 391,801

[22] Filed: Feb. 21, 1995

[51] Int. Cl.[6] .......... H04N 5/74

[52] U.S. Cl. .......... 313/477 R; 313/478

[58] Field of Search .......... 313/477 R, 423, 313/428, 421; 348/781, 782, 783, 784

[56] References Cited

U.S. PATENT DOCUMENTS

| | | | |
|---|---|---|---|
| 4,034,398 | 7/1977 | Sheldrake et al. | 313/474 |
| 4,177,400 | 12/1979 | Hergenrother et al. . | |
| 5,159,230 | 10/1992 | Pais | 313/478 |
| 5,204,751 | 4/1993 | Salyer et al. . | |

FOREIGN PATENT DOCUMENTS

| | | |
|---|---|---|
| 0471479 | 2/1992 | European Pat. Off. . |

*Primary Examiner*—Sandra L. O'Shea
*Assistant Examiner*—Vip Patel
*Attorney, Agent, or Firm*—Michael W. Sales; Wanda K. Denson-Low

[57] ABSTRACT

A projection cathode ray tube having an improved target assembly (22) for minimizing target tilt and hot focus drift is disclosed. The target member (24) is supported by a shaft screw (37) secured to a face plate (20) of the projection tube by an adjustment pad (58) external to the tube in cooperation with a biasing spring (46) internal to the tube that exerts a tensile load on the shaft screw (37). A shaft screw tapered shoulder (36) and threaded mounting stud (34) engage a tapered seat (32) and threaded mounting bore (30) of the target (24), with the taper angle (θ) common to the shoulder and seat calculated to maintain constant contact between the abutting surfaces of the shoulder (36) and the seat (32) during thermal expansion and contraction of the target member (24) and shaft screw (37).

12 Claims, 2 Drawing Sheets

PROJECTION CATHODE RAY TUBE HAVING TAPERED SHAFT SCREW TARGET ASSEMBLY

BACKGROUND OF THE INVENTION

1. Field of the Invention

The present invention relates to a projection cathode ray tube, and more particularly, to an improved mounting for the target member of the tube.

2. Description of the Prior Art

Projection cathode ray tubes that project electronically generated images upon a viewing screen external to the tube are well known in the art. Traditional components of such a tube include an electron gun for providing an electron beam, a target coated with a material responsive to the electron beam to produce an image, concave mirror for reflecting and amplifying the image, a target support assembly holding the target fixed with respect to the mirror, and a transparent face plate through which the amplified image is projected from the mirror.

In all uses of a projection cathode ray tube, a continuously focused and sharp image is desired. For example, in entertainment uses a sharp image assures viewing pleasure. In industrial information transfer applications, a sharp image is critically important to creating a life-like picture. One industrial application in which such a sharp and life-like image is required is in the training environment of flight simulators. The image presented to a trainee should desirably be so sharp and life-like that the trainee experiences the flight simulator as an actual flight in an aircraft.

For these reasons, significant attempts have been made to improve image quality of projection cathode ray tubes. However, conventional tubes are subject to a condition known as "hot focus drift", produced in the tube as follows. The tube heats during use. The target is heated most of all because of the electron beam hitting the target. This condition causes the material of the target to expand, and leads to undesirable changes in target distance with respect to the mirror. As a consequence of this electron beam heating of the target, and resultant linear displacement of the target face, the image becomes defocused. Angular displacement of the target, called "target tilt," is another undesirable condition causing misalignment of the image with respect to the tube's face plate. Target tilt may be caused by an accidental jolt during handling in transportation, use or service, or from deformation of the target because of differential thermal expansion between the target and its support structure.

A target assembly developed to dissipate heat and for angular stability against target tilt is shown in U.S. Pat. No. 4,177,400 to Hergenrother et al. A target support shaft extends through the face plate of the projection tube and is held in place by the combination of a compression spring extending between the target and the face plate interior on one side of the face plate and a slip-joint mounting pad on the outside of the face plate. The target has a threaded mounting bore receiving a threaded target stud portion of a connecting spindle. The spindle has a threaded shaft stud opposite the target stud, and the target is thus connected to the support shaft when the shaft stud is threaded into the support shaft. Angular adjustment of the target is achieved by the rotating of mounting pad set screws bearing against the face plate, thus changing the angle of the support shaft as it is held in tension by the compression spring. While this arrangement worked well enough to become the standard in the art, its slip-joint mounting pad structure proves inadequate to protect against linear or angular displacement of the target caused by even slight external knocks or impacts.

Further, heat-induced deformation of the target material is a continuing problem. Specifically, the compression spring bears on the target directly, and the target stud threaded into the target mounting bore has a spindle shoulder flange abutting the bore. The portion of the target that is located between this flange and the threads on the target stud expands and will deform when the fastener load exceeds the yield strength of the target material. When the target cools and contracts, the compression spring can displace and tilt the target by an amount as large as the clearance that remains after cooling between the deformed target portion and the spindle shoulder flange.

The design shown in U.S. Pat. No. 5,204,751 to Salyer et al. improved support shaft rigidity by employing external threads on the shaft to fasten the shaft to the internally threaded mounting pad, replacing the former slip-joint connection. In addition, a locking nut on the shaft loads the cooperating shaft-pad threads of the shaft and mounting pad to further inhibit movement at this connection. For additional rigidity, a set screw is threaded into the hollow shaft and bears against the shaft stud, loading the cooperating threads of the shaft and the shaft stud. Although the Salyer et al. patent apparatus provides increased shaft rigidity, the arrangement of a hollow shaft with a set screw is somewhat complex and not optimal for heat dissipation. Also, deformations caused by heating of the target material coupled with direct pressure from the compression spring remain as undesirable effects of normal operation of the tube.

Accordingly, it is an object of the present invention to provide a projection cathode ray tube having a target support assembly that avoids or minimizes the above mentioned problems.

It is a specific object of the present invention to provide a target assembly that controls target tilt by a tapered interface design, allowing the target to expand and contract freely with minimal deformation under electron beam heating.

It is another object of this invention to minimize target tilt by relocating spring-loading of the target assembly from the target to the support shaft.

It is yet another object of this invention to minimize hot focus drift through improved design of the target and target support assembly configuration and employment of low thermal expansion materials for the support shaft.

SUMMARY OF THE INVENTION

In carrying out principles of the present invention and in accordance with a preferred embodiment, an improved concept in target support for a projection cathode ray tube is provided for controlling target tilt and hot focus drift.

A projection cathode ray tube projects electrons onto a small target, generating an image on a sensitive coating of the target, which image in turn is reflected by a concave mirror and projected out through a transparent face plate of the tube. The target is supported in a vacuum by a support assembly that is designed to keep the target fixed in a pre-established position to maintain a properly focussed image. Since the target is subject to both linear (focus drift) and angular (target tilt) deviation with respect to the mirror, the projection cathode ray tube provides features to minimize both types of deviation.

The target member inside the tube is mounted on one end of a shaft screw, with the other end of the shaft screw extending outside the tube through an aperture in the center of the face plate.

To minimize target tilt while allowing angular adjustment of the target, a shaft screw is secured to the face plate by securing means including an adjustment pad threaded onto the shaft screw outside end and having reference surfaces bearing via adjustment screws on the outside surface of the face plate. To hold the shaft screw in line, a biasing spring exerts tension on the shaft screw by being compressed between the face plate interior and a spring flange mounted on the shank of the shaft screw. Where prior art projection cathode ray tubes applied spring force to the target itself, shifting the force to a flange on the rigid shank as provided by this invention removes a major source of target tilt.

Target tilt is also reduced by the tapered abutment between the target and the shaft screw, to be discussed in detail below in regard to hot focus drift. This novel concept prevents the deformation of the target that results from the non-tapered configuration of the prior art, allowing the target to expand and contract freely.

Angular positioning of the target is accomplished by moving the individual adjustment screw in each reference surface of the adjustment pad to change the distance from each reference surface to the face plate. A locking nut threaded on the outside end of the shaft screw and locked against the adjustment pad provides added assurance that shock or impact will not affect the adjustment of the shaft screw. Also, the evacuated integrity of the tube interior is maintained by a bellows connected and sealed at one of its ends to the face plate aperture, and sealed at its other end to a bellows flange on the shaft of the shaft screw.

An important feature of the present invention is the measurable reduction in hot focus drift achieved by the design of the target-to-shaft screw interface. The back portion of the target has a threaded blind mounting bore with an outwardly tapered seat that abuts a correspondingly tapered shoulder on the shaft screw when the externally threaded stud on the inner end of the shaft screw is fully engaged in the target mounting bore.

Constant contact between the abutting surfaces achieves a significant improvement over the prior art in reduction of hot focus drift by compensating for the differences in coefficients of expansion between the material of the target and that of the shaft screw. To achieve a constant contact between the shaft screw shoulder and the target bore seat during thermal expansion and contraction of the target and shaft screw, a critical angle for the taper is precisely calculated and adjusted as explained in the detailed description of an exemplary embodiment below. Preferably, the shaft screw is machined in one piece of INVAR 36 or an equivalent nickel-iron alloy of low coefficient of thermal expansion compared with stainless steel and copper.

According to another feature of the invention, the target member is thinned, i.e., reduced in thickness between the target coated face and the bottom of the target mounting bore. Thinning that portion of the target reduces focus drift and also facilitates inclusion of the tapered seat in the target member.

The advantages and features of the present invention will be better understood from the following description when considered in conjunction with the accompanying drawings in which.

DETAILED DESCRIPTION OF AN EXEMPLARY EMBODIMENT

Figure 1:
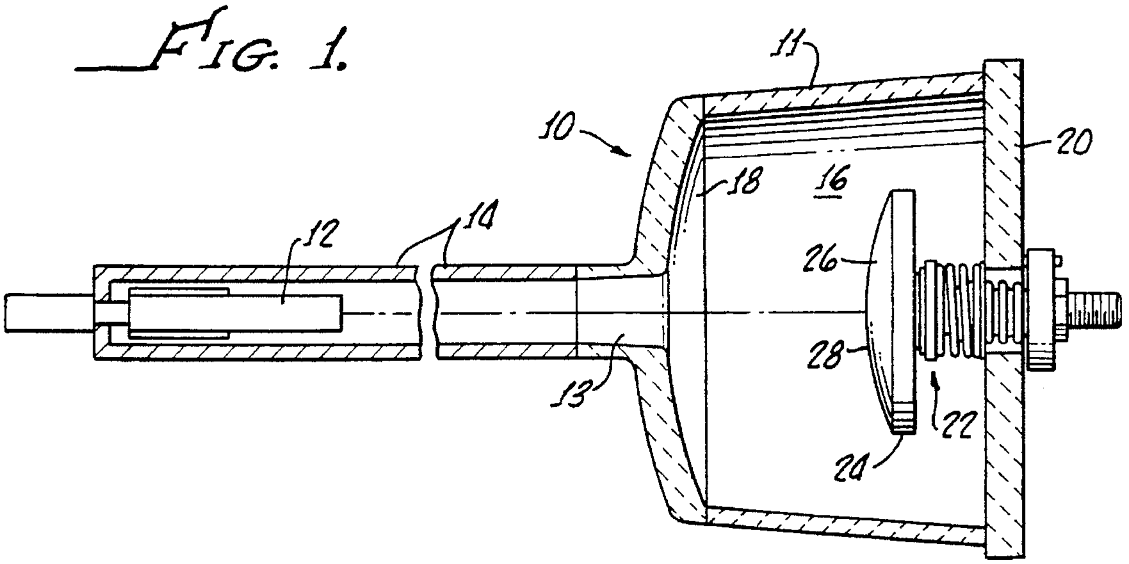
FIG. 1 is a side elevation view, partly in cross-section of a projection cathode ray tube embodying principle of the present invention.

A projection cathode ray tube 10 embodying principles of the present invention can be seen in FIG. 1. Tube 10 includes a scanning electron gun 12 mounted in a neck portion 14 that opens into and forms part of an evacuated interior 16 of the tube. A concave mirror 18 is disposed on one side of interior portion 16, and a face plate 20 is disposed at the opposite end of interior portion 16 from the mirror 18.

Mounted on the face plate 20 is a target assembly 22 including a target member 24. While this description of an exemplary embodiment of the invention relates to a projection cathode ray tube 10, it should be appreciated that the inventive concept relates to any assembly where it is required to provide a secure spatial mounting during thermal cycling for a component, such as target member 24, on a base such as faceplate 20.

Figure 2:
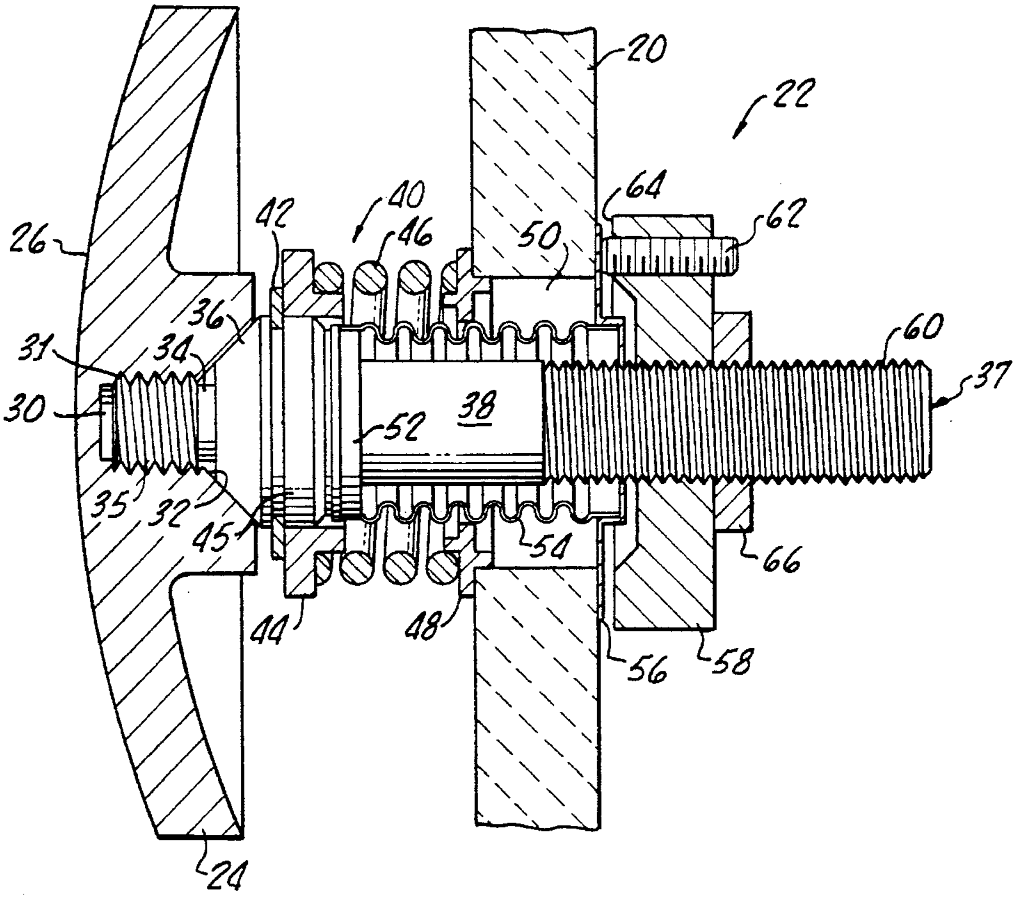
FIG. 2 is an enlarged section view of the target assembly of the projection cathode ray tube seen in FIG. 1.

Target member 24 is formed of an easily machinable, low cost metal such as aluminum, and is configured with an outer curved face 26 for receiving an electron beam from the electron gun. A coating 28 is carried on the face 26 and is responsive to the electron beam to produce a visible image. As FIG. 2 more clearly illustrates, the side of target member opposite curved face 26 has a threaded and tapered blind bore 30 having a threaded portion 31 and an outwardly diverging tapered seat 32. In order to provide cooperating means for securing the target to a shaft screw 37 this shaft screw 37 includes a tapered shoulder portion 36 leading to an integrally formed threaded stud 34. Stud 34 has a thread 35, threadably engaging threaded portion 31 of target 24. As a result of the threaded engagement of target 24 on shaft screw 37, the tapered seat 32 engages the mating tapered shoulder 36. The shaft screw 37 is fabricated preferably as one piece of easily machinable and low expansion coefficient material such as INVAR 36 metal alloy or the equivalent.

One feature of this invention provides for significant reduction of target tilt, i.e., unwanted angular displacement of target 24 causing an axial shift of the image away from an intended line of projection out of tube 10. Target tilt may occur in conventional target assemblies in which a compressive spring loads the target itself. Any deformation of the target threads with respect to the shaft screw mounting stud during heating of the target may cause a clearance to develop between the deformed target portion and the shaft flange abutting the target at right angles to the target. When the target cools, the compression spring displaces the target by the amount of the clearance, causing the target to tilt.

In the improved configuration embodying the principles of the present invention, the target assembly 22 includes on the intermediate shank 38 of shaft screw 37 a snap ring 42 bearing against a circumferential spring flange 44 which is mounted on an enlarged portion 45 of the screw shank 38 and is engaged by one end of a compression spring 46. The snap ring is held against axial motion in a groove on the shank 38. The opposite end of the compression spring 46 is compressed against face plate 20 through a flange seating ring 48 centered within a face plate central aperture 50. A bellows flange 52 is disposed adjacent to circumferential spring flange 44, near the side of flange 44 that is opposite target member 24. Bellows flange 52 is pressure sealed to an isolation bellows 54 that encircles and seals shaft screw 37. Bellows 54 is sealed at its opposite end to a sealing washer 56 on face plate 20 to preserve the evacuated state of tube interior portion 16.

Target assembly 22 is stably positioned within tube 10 by means securing the exterior end 60 of shaft screw 37 to face plate 20 as follows. An adjustment pad 58 is threaded on the end 60 of shaft screw 37 that projects externally of tube 10 through face plate aperture 50. Individual adjustment screws 62 project through reference surfaces 64 on pad 58 to bear against bellows sealing washer 56. Thus, pad 58 cooperates with biasing spring 46 to maintain shaft 37 adjustably mounted on face plate 20.

According to one feature of the present invention, the compression spring load of spring 46 is borne by the rigid shaft screw 37 at spring flange 44 which is mounted to the shaft screw, instead of being borne by the back of target 26 as configured in the prior art. Additionally, the target and shaft screw interface is not that of a shaft flange abutting the target at right angles (as described previously with reference to the prior art), but is now a smooth tapering abutment of the target and shaft screw mating surfaces. This tapered configuration diminishes the potential for clearances to remain after target cooling which is a prime cause of target tilt. The present arrangement of the spring 46 load, in combination with the tapered abutment of target 24 with shaft screw 37, thus significantly reduces target tilt caused by the tilting load and target deformation of the prior art non-tapered and target-loaded arrangement.

To impart additional stability to the target assembly, a locking nut 66 engages the external threads on shaft screw exterior end 60 and is torqued against pad 58 to load the cooperating threads on the pad and shaft screw. This thread loading provides additional protection against relative movement at this connection with the face plate, even under shock or impact. Calculation of the taper angle will now be discussed in more detail with respect to hot focus drift.

Several features of the present invention provide reduction of image defocusing due to hot focus drift between target 24 and mirror 18. Maximum contact between target 24 and shaft screw 37 during thermal expansion of both is achieved by the tapered configuration of their abutting surfaces. Target bore seat 32 abuts shaft screw shoulder 36 at a critical common tapered angle mathematically calculated and experimentally refined to maintain virtually constant contact between the abutting tapered surfaces during thermal cycling. As noted above, this abutment configuration not only diminishes the target 24 deformation that contributes to target tilt, but also allows the target 24 to expand and contract with minimal change (hot focus drift) in the distance between target 24 and mirror 18.

Figure 3:
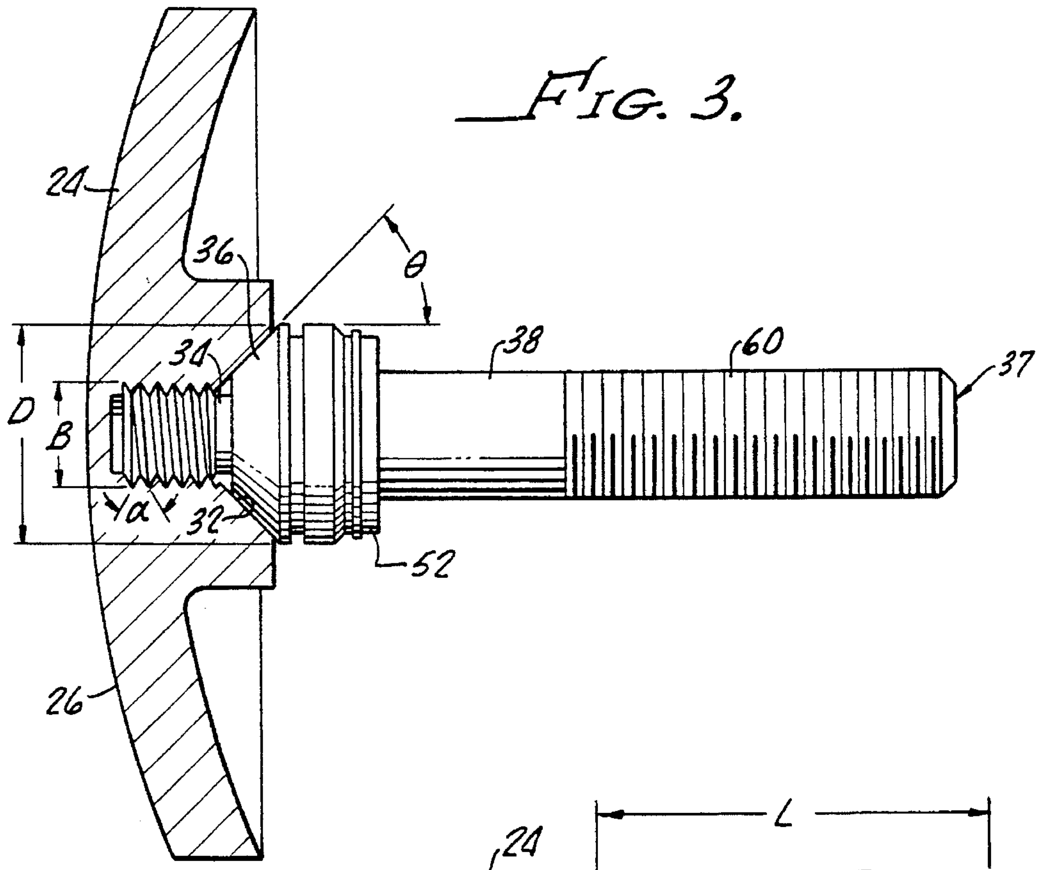
FIG. 3 is an elevation view of the shaft screw of the projection cathode ray tube embodying the present invention, showing the target member in cross-section.
Figure 4:
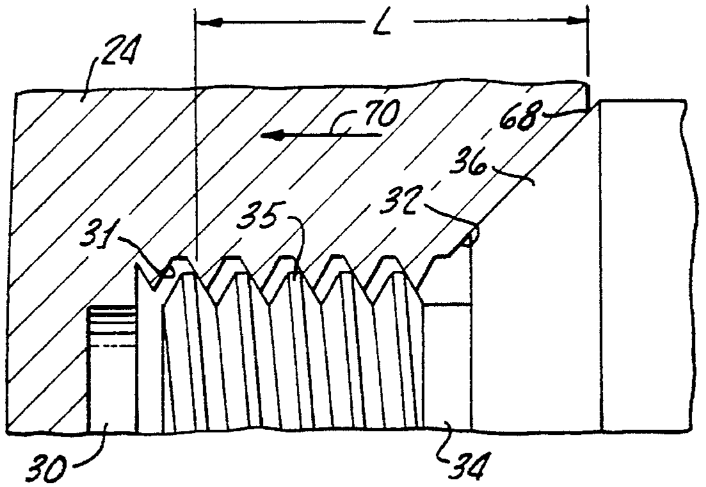
FIG. 4 is a partial elevation of the shaft screw with a portion of the target member in cross-section illustrating a room temperature condition of the threaded connection.
Figure 5:
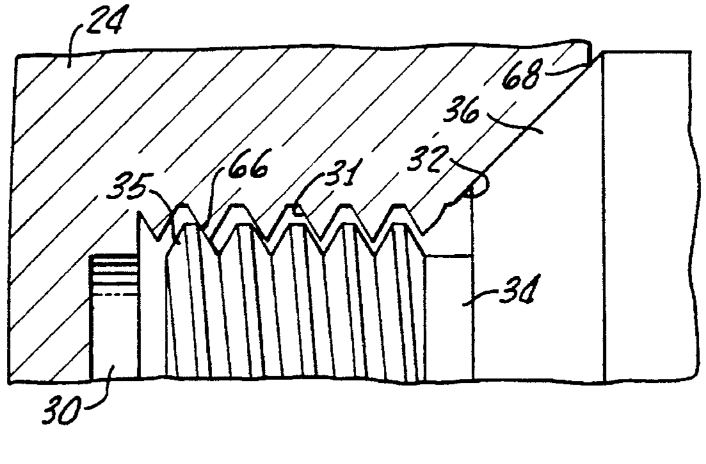
FIG. 5 is the partial elevation view of FIG. 4 illustrating a heated condition of the threaded connection of FIG. 4.

Calculation of critical taper angle θ may be explained with reference to FIGS. 3, 4 and 5. As electrons impinge on target 24, the heating of target 24 causes shaft screw stud 34 to become heated through conduction of target heat across the mechanical interface between the target and the stud. FIG. 4 illustrates the relationship between the target 24 and the shaft screw stud 34 and shoulder 36 at a room temperature original state. In this condition, stud threads 35 tightly engage target bore threads 31 all along the unexpanded length of bore 30, and tapered shoulder 36 of the shaft screw mates closely with target tapered seat 32. Because the coefficient of thermal expansion of target 24 (made of aluminum), is greater than that of stud 34 (made of Invar 36), target 24 will expand more than the stud 34 when temperature increases, causing both axial and radial thread clearance to develop at illustrated in FIG. 5. Clearances also tend to develop at the mating tapered surfaces 32, 36, but the common taper angle specifically designed as described below maintains close tapered surface contact throughout the thermal cycle. In other words no clearance develops between the mating tapered surfaces when the target and shaft screw are heated. Thread contact in the heated state is reduced to the extent that only the first thread of the stud makes contact with the target thread, at the contact point designated 66 in FIG. 5. Point 68 designates the end, or widest point of the intersection of tapered seat 32 of target 24 and the tapered shoulder 36 of the shaft screw at the base of the taper.

Both threaded portions 31, 35 and tapered surfaces 32, 36 develop or tend to develop axial and radial clearances as temperature rises. Nevertheless, a constant contact of the tapered seat 32 with tapered shoulder 36 is maintained during temperature-induced expansion by selecting a taper angle θ such that the net axial expansion of target length L equals the sum of the axial thread clearance and the axial taper clearance (that only tends to develop), where L is the distance between the first shaft stud thread contact point 66 and tapered surface intersection 68.

Stated otherwise, to maintain the desired continuous abutment contact along the taper as the target heats, the angle θ (FIG. 3) of the taper must be established so that point 68 of the target seat 32 follows the taper of the shoulder 36 as the axial distance L is increasing in the direction indicated by arrow 70. This taper angle is calculated by setting the net axial expansion (i.e., the expansion of target 24 relative to expansion of the screw over length L) equal to the sum of the thread axial clearance plus the taper axial clearance. This taper axial clearance is the clearance that tends to be caused in part by the greater radial expansion of the target bore seat which also has an axial expansion. However, because of the described configuration, taper clearance does not actually occur and the two tapered surfaces remain in contact with each other. Recognizing that the amount of radial and axial expansion for a given temperature change is a function of thread diameter B, taper base diameter D, axial distance L from the fixed thread to the base of the taper and the coefficients of thermal expansion, it can be shown that for a conventionally defined angle α (FIG. 3) between the threads 31, 35:

$$L=[\tan(\alpha/2)](B/2)+[(D/2)/\tan\theta]. \qquad \text{(Eq. 1.)}$$

For a standard thread angle α of 60°, $$L=(\tan 30°)(B/2)+[(D/2)/\tan\theta]. \qquad \text{(Eq. 2.)}$$

Solving for θ, $$\tan\theta=(D/2)/[L-(\tan 30°)(B/2)]. \qquad \text{(Eq. 3.)}$$

It will be noted that these final equations (Equations 1 through 3) are independent of coefficients of thermal expansion. This is because the relationship between the expansion coefficients of the materials of target 24 and the stud and shoulder 34, 36 is represented by the same expression on both sides of the preliminary equations (not presented) leading to Equation 1.

A ⅜"-16 thread, which has a standard thread angle of 60°, is preferable for economic production reasons including ability to roll the threads (instead of cutting) and diminished lathe time. For a length L approximately 0.438", a ⅜"-16 thread diameter B of 0.375 inches and a taper base D of 0.625 inches, taper angle θ is calculated to be approximately 44°. Mathematical calculations indicate that the hot focus drift can be reduced ideally to 0.40" for 1000 μA of beam current impinging on the target in a target-face covering flat pattern or "flat raster". The variable L is adjusted to develop optimum hot focus drift conditions for a fixed taper angle of 45° or, alternatively, the taper angle can be adjusted to more closely approach the aforementioned theoretical hot focus drift of 0.40" at 1000 μA of beam current.

It will be appreciated that in addition to compensating for expansion changes between the target 24 and shaft screw 37, thus minimizing both hot focus drift and target tilt, the tight contact between shoulder 36 and seat 32 also improves and maintains the conduction and dissipation of heat from target 24. As more heat is conducted away from target 24 because of the continuously maintained contiguity of these mating surfaces, the target cools, resulting in low target temperature and reduced hot focus drift. Additionally, two other features of the present invention contribute significantly to the reduction of hot focus drift. First, replacement of a stainless steel shaft screw in the conventional configuration (i.e., employing a separate stud) with a low coefficient, of expansion iron-nickel alloy such as INVAR 36 reduces hot focus drift by one-third; further reduction in drift is achieved by the one-piece configuration (integral stud) of the tapered shoulder shaft screw 37 described in the exemplary embodiment. Second, thinning the target 24 to an optimum 0.09" at its center, thereby decreasing target thermal mass, was found to reduce hot focus drift as well. The cumulative effect of employing an all-INVAR shaft screw 37 with a target 24 thinned to 0.09 inches thus produces very low hot focus drift at a standard 1 mA flat raster.

Results of development tests verify that the present invention has dramatically reduced target tilt from the 3 inches of tilt that is observed on prior production tubes to less than 1 inch at 1 mA flat raster. Hot focus drift is reduced from over 2 inches to about 1 inch at 1 mA flat raster, a significant improvement.

The depiction of the present invention by reference to a single exemplary embodiment is not intended to imply a limitation on the invention, which is limited only by the spirit and scope of the appended claims.

What is claimed is:

1. A projection cathode ray tube comprising:

a sealed evacuated envelope including a tubular portion, a mirror portion sealed to one end of the tubular portion, the mirror portion having an inner concave mirror surface with a mirror aperture therein, an electron gun portion sealed to the mirror aperture, and a transparent face plate sealed to the other end of the, tubular portion, the face plate having an aperture therein;

a target member disposed within said envelope having a center and an internally threaded mounting bore;

a shaft screw having a first end terminating in a threaded stud engaged in said target member mounting bore, a second end extending through said face plate aperture, and intermediate shank between said first and second shaft screw ends, said shaft screw having a tapered shoulder and said target member having a corresponding outwardly divergent tapered seat for receiving said tapered shoulder wherein said shaft screw tapered shoulder and said target member tapered seat have a common taper angle that achieves constant contact between said shoulder and said seat during thermal expansion and contraction of said target member and said shaft screw and said taper angle for said constant contact is defined by $$\tan\theta=(D/2)/[L-(\tan(\alpha/2)(B/2)]$$

where

θ=said taper angle

α=thread angle of the threads of said stud and bore

B=shaft screw stud thread diameter

L=axial distance from a first thread on said stud to the point of widest intersection of said shoulder with said seat D=diameter of said taper at said intersection;

securing means for securing said second end to said face plate; and an electron gun within said electron gun portion positioned to project electrons onto said target member.

2. The projection tube of claim 1 wherein said tapered angle is in the range of 44° to 46° for a ⅜-16 thread, said threaded stud having a thread angle of 60°.

3. The projection tube of claim 1 wherein said shaft screw is fabricated from iron - nickel low expansion alloy.

4. The projection tube of claim 1 wherein said securing means comprises:

adjustment means threadably engaging said shaft screw second end external to said sealed tube envelope; and biasing means for holding said shaft screw under tension.

5. The projection tube of claim 4 wherein said biasing means comprises:

a circumferential spring flange mounted on said intermediate shank adjacent said tapered abutment means; and a compression spring compressed between said face plate and said spring flange, coaxially encircling said intermediate shank.

6. The projection tube of claim 4 wherein said adjustment means comprises:

an adjustment pad extending radially from said shaft screw second end, said adjustment pad having a plurality of reference surfaces thereon;

means for independently adjusting each of said reference surfaces relative to said face plate.

7. The projection tube of claim 1 wherein said target member thickness is on the order of 0.09" at said center thereof.

8. Apparatus for improving the spatial stability during thermal cycling of a component mounted on a base, said apparatus comprising:

a mounting portion of said component having an internally threaded mounting bore including an outwardly diverging tapered seat;

a shaft screw mounted to said base and having an externally threaded mounting stud threadably engaging said component mounting bore and a tapered shoulder adjacent said mounting stud in mating engagement with said mounting bore tapered seat, wherein said tapered shoulder and said tapered seat have a common taper angle that achieves constant contact between said shoulder and said seat during said thermal cycling of said component and shaft screw and wherein said bore and shaft stud have interengaging threads, and wherein thermal expansion of said component and shaft screw tends to induce an axial thread clearance between threads of said bore and threads of said shaft and an axial taper clearance between said tapered seat and said tapered shoulder, and wherein said shaft has a length L from the first thread on the shaft to the end of the intersection between said tapered seat and tapered shoulder, and wherein the taper angle of said tapered seat and tapered shoulder has a value that causes the net axial expansion of said target relative to said shaft, over said length L, to equal the sum of said axial thread clearance and said axial taper clearance.

9. The apparatus of claim 8 wherein said common taper angle that achieves said constant contact is defined by $$\tan \theta=(D/2)/[L-(\tan (\alpha/2))\ (B/2]$$

where

θ=said taper angle

α=thread angle of the threads of said stud and bore

B=shaft screw stud thread diameter

L=axial distance from a first thread on said stud to the point of widest intersection of said shoulder with said seat D=diameter of said taper at said intersection.

10. In a projection cathode ray tube including a sealed evacuated tubular portion having a mirror portion at one end thereof and a transparent face plate having a face plate aperture therein at the other end thereof, a target assembly comprising:

a target member having a center and an electron beam sensitive coating for forming an image, said target member disposed within said evacuated tubular portion and adjustable with reference to said mirror portion, and having a threaded mounting bore provided with a tapered seat;

a shaft screw having a first end terminating in a threaded stud engaged in said target member mounting bore, said first end having a tapered shoulder mating with said mounting bore tapered seat wherein said shaft screw tapered shoulder and said mounting bore tapered seat have a common taper angle that achieves constant contact between said shoulder and said seat during thermal expansion of said target member and said shaft screw and said taper angle is in the range of 44° to 46° for a ⅜-16 thread, said threaded stud having a thread angle of 60°, said shaft screw having a second end threaded and extending axially through said face plate aperture to the exterior of said evacuated portion, and said shaft screw having an intermediate shank between said first and second shaft screw ends including a circumferential spring flange mounted adjacent said tapered shoulder and a bellows flange adjacent said circumferential spring flange;

a compression spring coaxially encircling said shaft screw intermediate shank, said compression spring bearing at one end on said face plate and at the other end on said intermediate shank circumferential spring flange for exerting tensile force axially upon said shaft screw;

bellows having one end sealed to said face plate central aperture and the other end sealed to said intermediate shank bellows flange, said bellows coaxially encircling said shaft screw; and an adjustment pad having reference surfaces thereon, extending radially from and threadably engaging said shaft screw second end and having means for independently adjusting each of said reference surfaces relative to said face plate.

11. The target assembly of claim 10 wherein said shaft screw is fabricated from iron-nickel low expansion alloy.

12. The target assembly of claim 10 wherein said target member thickness is on the order of 0.09 inch at its center.

* * * * *